(12) United States Patent
Gao et al.

(10) Patent No.: US 6,395,175 B1
(45) Date of Patent: May 28, 2002

(54) METHOD AND APPARATUS FOR ENERGY EFFICIENT SELF-AERATION IN CHEMICAL, BIOCHEMICAL, AND WASTEWATER TREATMENT PROCESSES

(75) Inventors: Johnway Gao, Richland, WA (US); Rodney S. Skeen, Pendleton, OR (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/541,868

(22) Filed: Apr. 3, 2000

(51) Int. Cl.[7] .............................. C02F 1/74; C02F 3/02; B01F 5/00
(52) U.S. Cl. ...................... 210/610; 210/620; 210/752; 210/199; 210/205; 261/75; 261/DIG. 54; 261/DIG. 75; 366/163.2
(58) Field of Search .................................. 210/610, 620, 210/749, 758, 198.1, 205, 752, 199; 261/75, 76, 115, 116, DIG. 54, DIG. 56, DIG. 75; 366/163.2, 341; 417/54, 151, 196

(56) References Cited

U.S. PATENT DOCUMENTS

| | | | |
|---|---|---|---|
| 1,449,504 A | * | 3/1923 | Ehrhart |
| 2,563,002 A | * | 8/1951 | Bissel et al. |
| 3,321,891 A | * | 5/1967 | Coanda |
| 3,813,086 A | | 5/1974 | Ebner et al. ............... 261/93 |
| 3,920,779 A | | 11/1975 | Abele ......................... 261/87 |
| 4,007,920 A | | 2/1977 | Plunguian et al. ......... 259/108 |
| 4,087,862 A | * | 5/1978 | Tsien |
| 4,344,752 A | * | 8/1982 | Gallagher, Jr. |
| 4,371,382 A | * | 2/1983 | Ross |
| 4,652,382 A | | 3/1987 | Edwards et al. ............ 210/752 |
| 4,861,165 A | * | 8/1989 | Fredriksson et al. |
| 5,356,570 A | | 10/1994 | Golob et al. ................ 261/93 |
| 5,397,179 A | * | 3/1995 | Berlin et al. |
| 5,458,816 A | | 10/1995 | Ebner et al. ................ 261/64.1 |
| 5,470,153 A | | 11/1995 | De Naeghel ................ 366/303 |
| 5,514,267 A | | 5/1996 | Machiya et al. ............ 210/170 |
| 5,863,119 A | | 1/1999 | Yergovich et al. .......... 366/137 |
| 6,095,675 A | * | 8/2000 | Tai |

FOREIGN PATENT DOCUMENTS

CN 87 2 13094 5/1988

OTHER PUBLICATIONS

JE Bailey et al., "Biochemical Engineering Fundamentals", pp. 622–630. 1986, 87.
RB Bird et al., "Transport Phenomena", pp. 471–473. 1960.
J Gao et al., "Technical Report for the Production of Pharmaceutical Grade Yeast Using 50,000-Liter Pulse Spilling Self-Aeration Bioreactor", pp. 1–9. 1989.
KR Kao et al., "Application of 200,000-Liter Pulse Spilling Self-Aeration Bioreactor For Wastewater Treatment (And Single Cell Protein Production) of Glutamic Acid Protection Process", pp. 1–4. 1991.
KR Kao et al., "Application of Pulse Spilling Self-Aerator in Textile Wastewater Treatment to Replace Ross Air Blower", pp. 21–22. 1994.

* cited by examiner

Primary Examiner—David A. Simmons
Assistant Examiner—Fred Prince
(74) Attorney, Agent, or Firm—Stephen R. May (57) ABSTRACT

The present invention is a pulse spilling self-aerator (PSSA) that has the potential to greatly lower the installation, operation, and maintenance cost associated with aerating and mixing aqueous solutions. Currently, large quantities of low-pressure air are required in aeration systems to support many biochemical production processes and wastewater treatment plants. Oxygen is traditionally supplied and mixed by a compressor or blower and a mechanical agitator. These systems have high-energy requirements and high installation and maintenance costs. The PSSA provides a mixing and aeration capability that can increase operational efficiency and reduce overall cost.

22 Claims, 10 Drawing Sheets

METHOD AND APPARATUS FOR ENERGY EFFICIENT SELF-AERATION IN CHEMICAL, BIOCHEMICAL, AND WASTEWATER TREATMENT PROCESSES

This invention was made with Government support under Contract DE-AC0676RLO1830 awarded by the U.S. Department of Energy. The Government has certain rights in the invention.

FIELD OF THE INVENTION

The present invention relates generally to a process and apparatus for mixing and aerating a fluid stream by circulating a first fluid through a pulse spilled self-aerator (PSSA) such that a vacuum is generated at one or more discrete points thereby entraining a second fluid into the circulating fluid. More specifically, this process provides a method and apparatus for energy efficient self-aeration in chemical, biochemical, and wastewater treatment processes.

BACKGROUND OF THE INVENTION

Large quantities of low-pressure air are required in aeration systems to support many biochemical production processes and wastewater treatment plants. Oxygen is traditionally supplied and mixed by a compressor or blower and a mechanical agitator. These systems have high-energy requirements and high installation and maintenance costs. Aeration, agitation, and oxygen transfer to aqueous phase are important in aerobic fermentation processes. Various fermentation systems are designed to meet the oxygen requirement of aerobic microorganism cultures for the production of amino acids, enzymes, and cell biomass, among others. One of the most commonly used systems is the aerated stirred tank reactor, which requires both an air compression system and an agitation system to provide oxygen to the culture as well as mixing. In this system, the reactor is equipped with a motor mounted on top of the reactor, which drives a shaft through the top of the reactor vessel down to the bottom of the reactor. Consequently, the shaft drives flat-blade turbines attached to the shaft for fluid mixing and bubble breaking for oxygen transfer into reaction broth. An aseptic seal is placed between the shaft and reactor vessel for sterile control. An air compression system is used to provide sterile air through a series of air processing equipment, typically containing air storage tank, oil removing tank, water removing rank, air heater, and air filter. The sterile air is aerated into the reactor through an air sparger on the bottom of the reactor. In general, the aerated stirred tank reactor system is of high performance, however, rather complicated and with high power input.

To maintain the reactor performance and simplify the reactor system as well as to lower the energy efficiency for gas dispersion and mixing, reactors with self-aspirating capability were also developed. These types of reactors include self-aspirating reactor with a rotor and a surrounding stator, and similar reactor serial with a special design rotor for aeration and mixing. This type of reactor eliminates the air compression system by a self-aspirating rotor and a distribution stator. The rotor is generally placed on the bottom of the reactor and submerged in the reaction broth. The rotor rotates at high speed and generates a vacuum in the rotor center, connected to the hollow shaft to induce air into the reactor system. The rotor performs both aeration and fluid mixing at the same time. This type of reactor system is rather energy efficient and simple in structure. However, the rotor self-aspirating reactor still has large fast moving parts inside the reactor and the maintenance is significant through a manhole on top of the reactor. Another type of self-aerating reactors, Venturi-type reactor serials were also developed using a special design nozzle for aeration and mixing. This type of reactor applies the Venturi tube principle that a vacuum can be created behind an orifice, through which high pressure or high velocity fluid passes. An air inlet can be opened after the orifice or nozzle for air induction. Air can be automatically sucked into the Venturi device and mixed with the oncoming fluid for air bubble dispersion and oxygen transfer. The high velocity air-fluid mixture is ejected into the reactor to mix with the main body of the reaction broth for further oxygen and nutrient transfer. The Venturi type of reactor further simplifies the agitated aerobic reactor system by removing the rotor or turbine impeller inside the reactor. However, this type of reactor requires high fluid pressure at the nozzle, which is in general driven by a high-speed circulation pump.

Therefore, it is apparent that there is a need in the industry for a mixing and/or aerating device that has few or no moving parts, low maintenance requirements, high efficiency, efficient mass transfer, low operational costs, and requires low capitol investment.

SUMMARY OF THE INVENTION

A method and apparatus is disclosed for mixing and agitating a fluid stream by circulating a first fluid through a pulse spilled self-aerator (PSSA) such that a vacuum is generated at one or more discrete points within the PSSA, providing a fluid mixture by entraining a second fluid into the circulating first fluid at the location of one or more discrete points via said vacuum, mixing and agitating the fluid mixture by a pulsing flow aided by gravitation flow vertically down one or more concentric units having at least one straight duct and at least one fluid pulsing unit. While the invention is preferably disclosed in the environment of aeration of liquid streams, it is to be understood that the process and apparatus of the present invention is applicable to the mixing of any fluid-like streams, whether liquid, solid or gaseous.

It is therefore an object of this invention to provide a method and apparatus for mixing and aerating a fluid stream in chemical, biochemical and wastewater treatment processes.

It is a further object of this invention to provide a system for mixing and aerating a fluid stream that is simple in construction.

It is another object of this invention to provide a system for mixing and aerating a fluid that requires low power consumption.

It is yet another object of this invention to provide a system for mixing and aerating a fluid that requires low capital investment.

It is another object of this invention to provide a system for mixing and aerating a fluid with efficient mass transfer.

It is yet another object of this invention to provide a system for mixing and aerating a fluid with low maintenance requirements.

It is another object of this invention to provide a system for mixing and aerating a fluid with low operational costs.

It is yet another object of this invention to provide a system for mixing and aerating a fluid with low operational noise.

It is another object of this invention to provide a system for mixing and aerating a fluid that allows for further enhancement of aeration by offering multiple PSSA's to be used in a fluid system.

DESCRIPTION OF THE PREFERRED EMBODIMENT(S)

Figure 1:
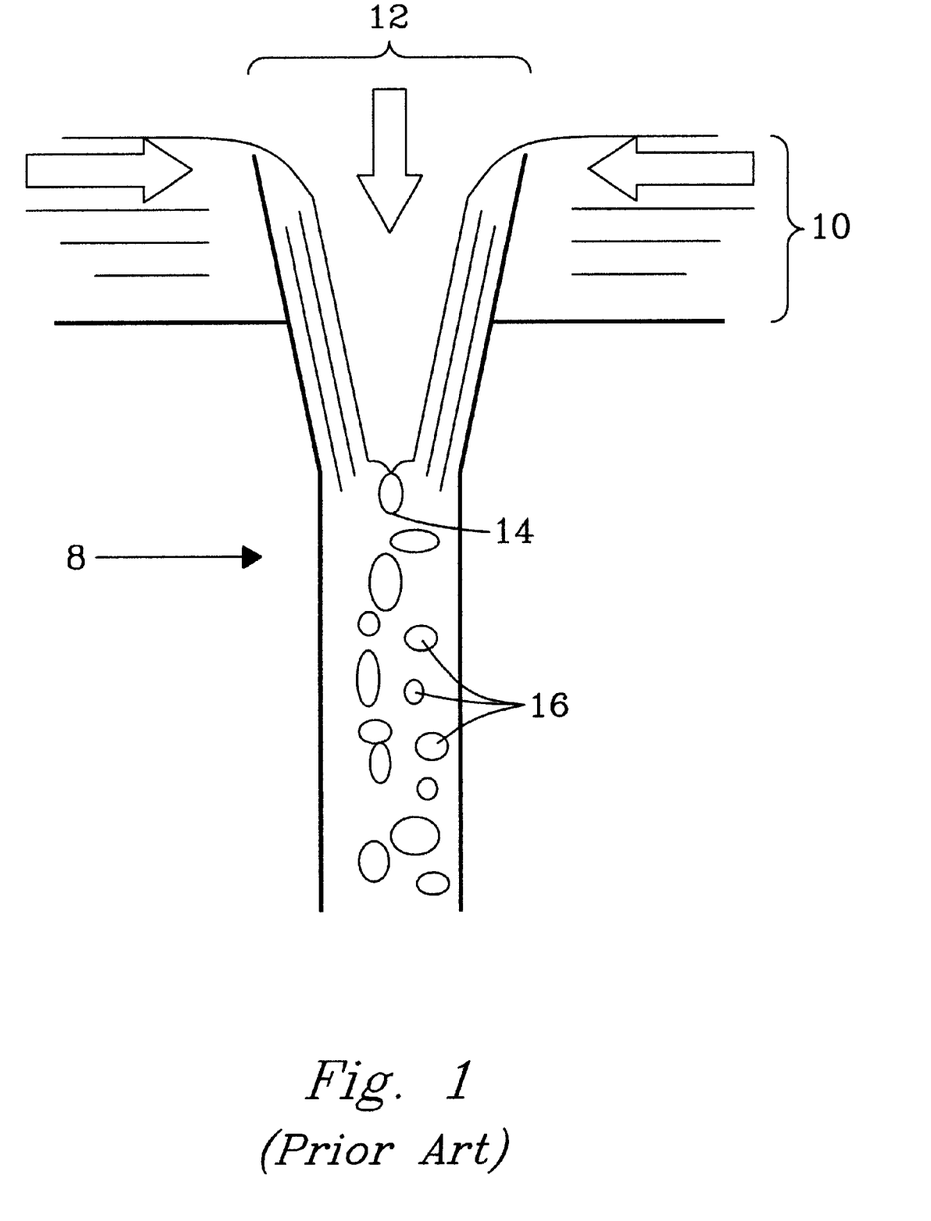
FIG. 1 is a graphic representation of the mechanism of self-aeration or fluid entrainment.
Figures 2, 2A:
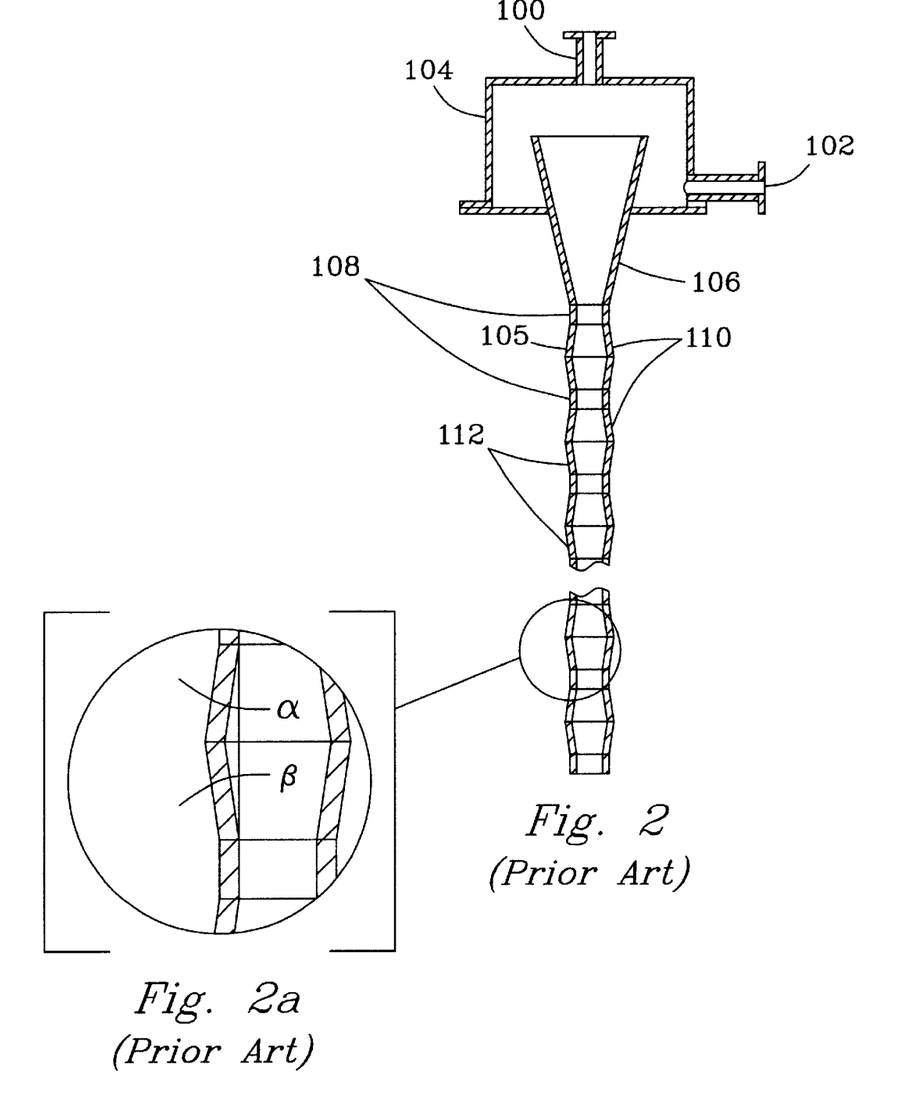
FIG. 2 is a graphic representation of a single pulsing spilling self-aerator of the prior art.
FIG. 2a is an enlargement of a portion of FIG. 2 illustrating the angle of the diffuser cone and the reducer cone.

A single PSSA 105 (FIG. 2) was designed for aerobic fermentation processes such as single cell protein production. FIG. 1 shows the mechanism by which the PSSA entrains a first gas or other fluid 12 at a discrete point 14 to allow self-aeration of a freely falling second fluid 10. The entrained first gas or other fluid 12 is dispersed into fine bubbles 16 inside the PSSA. FIG. 2 shows the original structure of a single PSSA 105, with a first fluid inlet 102; a second fluid inlet 100; a fluid chamber 104; a fluid induction cone 106; a plurality of pulser connection tubes 108; a plurality of diffusing cones (diffusers) 110; and a plurality of reducing cones (reducers) 112.

In this design, the PSSA primarily consists of a fluid chamber 104, a fluid induction cone 106, and a number of pulsers. A pulser in this preferred embodiment is a unit consisting of a diffusing cone 110 and a reducing cone 112, interconnected to one another. The pulsing tube comprises a plurality of pulsers and pulser connection tubes 108, each of which connects two pulsers together. The pulsing tube is connected to the fluid induction cone 106 by the pulser connection tube 108, and the fluid induction cone is joined to the fluid chamber 104. FIG. 2a shows an enlargement of a portion of FIG. 2 illustrating the angle of the diffuser cone α and the reducer cone β.

The oxygen transfer rate for a 20-liter reactor with a single 25-mm diameter ($Dr_{20}$) PSSA reaches 3.4 kg-$O_2$/m$^3$/hr at a power input level of 0.67 watt per liter reactor volume. Under such conditions, the reactor can be used to support an aerobic fermentation process requiring an oxygen transfer rate less than 3.4 kg-$O_2$/m$^3$/hr. Based on the PSSA principle, the tallest PSSA need only be 10 meters to reach the maximum vacuum.

If this reactor is scaled up to 100 m$^3$, the design parameters of a single PSSA are evaluated as following. If the reactor is scaled up based on the same geometry H/D=2.0, where H is the height of the reactor, and D is the diameter of the reactor, the 100-m$^3$ reactor requires a reactor diameter of 4.0 meter. Based on H/D=2.0, a 20-liter reactor has a reactor diameter of 0.234 meter ($D_{20}$), and $D_{20}/Dr_{20}$=9.36. Therefore, the 100-m$^3$ reactor has a PSSA diameter of 0.43 meter. When a pulser is designed in the iso-conical shape or a α=β, the 100-m$^3$ reactor has only 3.5 pulser units when α=10° and effective PSSA height equals 10 meter. However, 3.5 pulser units of a single PSSA are insufficient for PSSA function since a 20-liter reactor with a 25-mm PSSA of 4 meters has 24 pulser units. Based on the empirical design, a PSSA having 10 or more pulser units within 10 meter will be sufficient for both aeration and oxygenation.

Therefore, a PSSA with ten pulser units are to be used for all reactor design. The following equation can be used to calculate the reducing end diameter of a pulser under various design parameters when the dual mPSSA has a height of 10 meters and 10 pulser units:

$$Dr = \frac{1}{\frac{b-1}{\text{TAN}(\alpha)} + a}$$

where Dr is the reducing end diameter; b is a design parameter which equals the ratio of defusing end diameter (Dd) to reducing end diameter (Dr); a is another design parameter which equals the ratio of the connection tube height to its diameter, and α is equal to half of the conical angle in a pulser unit.

Figure 3:
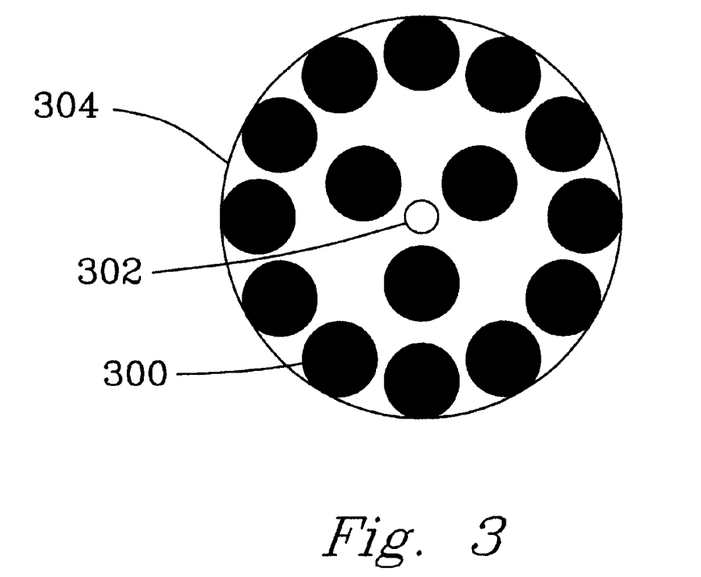
FIG. 3 is a graphic representation of cross-sectional view of a 100-m$^3$ reactor with 15 single PSSA units.
Figure 4:
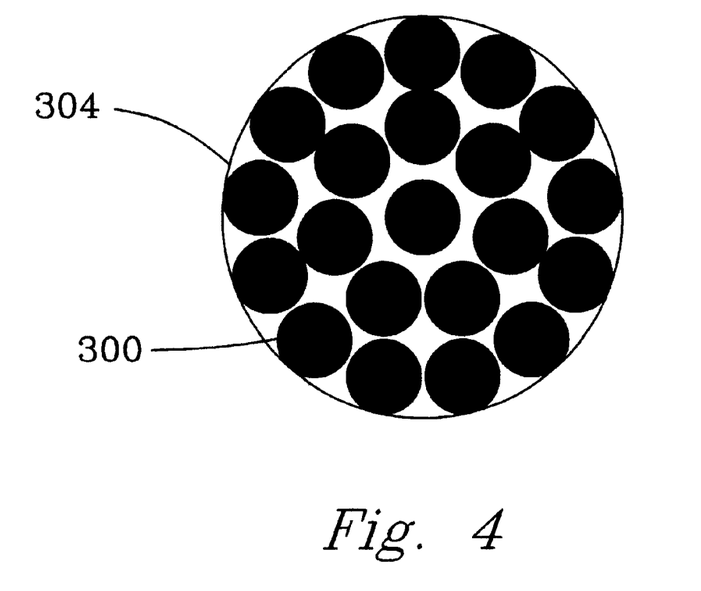
FIG. 4 is a graphic representation of a cross-sectional view of a 100-m$^3$ reactor with 21 single PSSA units.

At α=15° and a=1.0, the 100 m$^3$ reactor requires 4 PSSA units with 0.21 meter diameter in the reducing end and with 0.41 meter diameter in the diffusing end (b=2.0). However, this design can only support an aerobic culture with an oxygen consumption rate less than 3.4 kg-$O_2$/m$^3$/hr at the power input of 0.67 to 1.0 kw/m3-reactor volume. To meet the higher oxygen demand, for example, 13 to 18 kg-$O_2$/m$^3$/hr of an aerobic culture, the reactor would need 15 to 21 PSSA units (FIGS. 3 and 4) on top of the reactor. However, the reactor with 4-meter diameter only has an open area of 12.56 square meters on the top, on which it will be very congested to put 15 to 21 PSSA units. Further, it would be very complicated to install all these PSSA units on the reactor top. FIGS. 3 and 4 show the placement of 15 PSSA units 300 and 21 PSSA units 300 on top of the 100-m$^3$ reactor 304 respectively. Therefore, to meet the high oxygen demand, an alternative aerator design is needed for same aeration and oxygen transfer rate with few aeration units.

Figure 5:
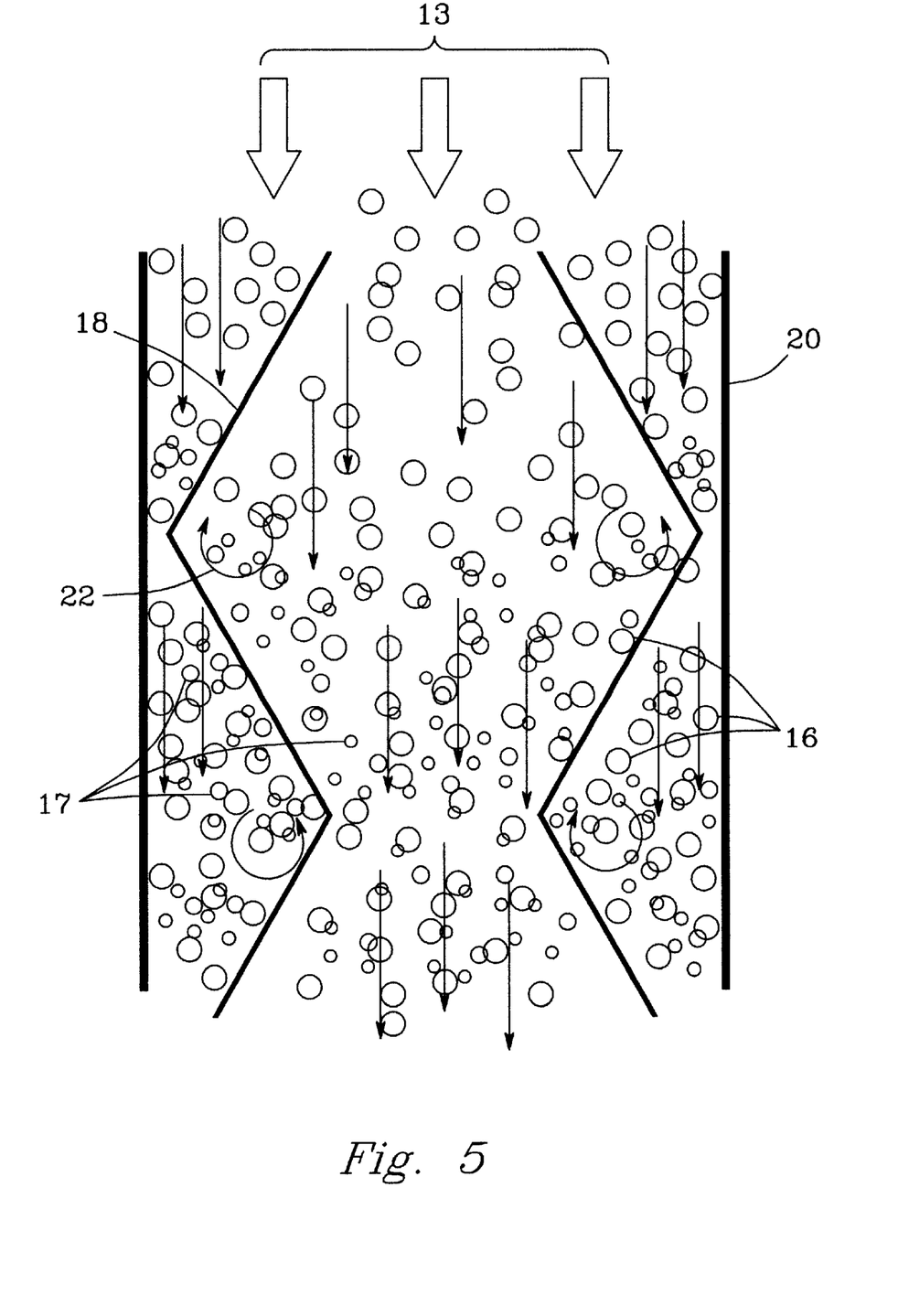
FIG. 5 is a graphic representation of two-phase flow of the present invention.

An integrated multi-pulsing spilling self-aerator (mPSSA) has been designed to increase the aeration levels of even larger fluid streams such as those used in aerobic fermentation processes. An mPSSA system can be designed in various geometric combinations such as a concentric straight and pulse tubes (FIGS. 6 and 9), concentric straight tube and pulse sheet (FIG. 7), and square or rectangle tubes and pulse sheets (FIG. 8). The basic operating theory behind the mPSSA is that by circulating a liquid or other first fluid through the aerator, a vacuum is created by the freely spilling aqueous phase, which results in air or other second fluid being drawn or entrained into the liquid phase. This fluid mixture then flows through the mPSSA mixing section (FIG. 5), where highly turbulent conditions produce fine air bubbles from larger entrained gas bubble to enhance gas transfer. More importantly, the dual and multiple PSSA aerators not only create pulsing flow in the center pulse tube as the single PSSA aerator, but also provide turbulent pulse mixing outside the center pulse tube for the dual PSSA and in different layers of the multiple PSSA. This pulse flow features between the pulse tube 8 (reducer and diffuser areas) and the straight tube 20, where gas-aqueous phase quickly change its flow speed to create strong turbulent shearing force 22 to break down coarse air bubbles 16 to fine air bubbles 17 for efficient oxygen transfer and to maintain this effect throughout the pulse tube. For the dual PSSA aerator (FIG. 6), the outside pulsing turbulent flow of gas-aqueous mixture is created between the outside surface wall of the pulsing tube and the inner straight tube wall. For the multiple PSSA, this turbulent pulse flow is created in the multiple layers of pulse tube and straight tube of the aerator, providing efficient oxygen transfer to the aqueous phase. The fluid exits the mPSSA as a well-mixed, well-agitated fluid mixture (a preferred embodiment is an air-aqueous phase) into the fermentation reactor to provide both oxygenation and mixing.

The mPSSA aerator has several advantages over conventional aeration and mixing systems such as requiring less power for the same benefits, oxygenation and agitation. In addition, the mPSSA eliminates the need for separate mechanical agitator and air compression systems, which reduces the complexity of the processing equipment. Finally, an mPSSA is simple and compact so that it is suitable for industrial fermentation For example, the present invention is designed not only for general aerobic microbial fermentation process requiring oxygen delivery of 10 to 100 mmoles-$O_2$L/hr (0.32 to 3.2 kg-$O_2$/m$^3$/hr), but also for aerobic process requiring oxygen consumption rate larger than 3.2 kg-$O_2$/m$^3$/hr.

For a clear and concise understanding of the specification and claims, including the scope given to such terms, the following definitions are provided:

SELF-AERATION: an aeration process that induces air into a reactor or fermentor using aqueous circulation, and does not rely on an air compressor or air blower.

SPILLING/OVERFLOWING: free flow of a fluid over an edge or brim of a duct, tube or cone.

FLUID CHAMBER: a vessel where a second fluid is introduced and filled by a vacuum generated by a first fluid spilling/overflowing, and the preferred second fluid is air and the preferred first fluid is liquid.

FLUID INDUCTION TUBE/DUCT/CONE: a tube, duct or cone that induces the drawing of, or causes to flow forth, a second fluid by a vacuum generated by aqueous spilling/overflowing of a first fluid.

DIFFUSING CONE (DIFFUSER): A diffusing cone is a conical shape tube that has a smaller internal diameter on the top and a larger internal diameter on the bottom.

REDUCING CONE (REDUCER): A reducing cone is a conical shape tube that has a larger internal diameter on the top and a smaller internal diameter on the bottom.

PULSING UNIT: A unit comprising a diffusing cone and a reducing cone, interconnected to one another.

FLUID PULSER: An element of a Pulsed Spilling Self-Aerating (PSSA) system comprising a plurality of pulsing units or pulsed angular units interconnected to one another allowing a pulsing flow of a fluid or fluid mixture.

PULSED-ANGULAR SHEET: A specific embodiment of a fluid pulser, providing a series of angular units interconnected, wherein an alternating periodic series of angular undulations or corrugations allow a pulsing flow of a fluid or fluid mixture.

PULSED-ANGULAR UNIT: A unit comprising a left-slanted pulsing sheet and a right-slanted pulsing sheet interconnected, wherein "left-slanted" and "right-slanted" refer to different relative position or angle.

mPSSA HEIGHT: Effective height or cumulative height of all the pulser units.

PULSING FLOW: a flow that changes its velocity from a higher flow speed to a lower speed, and back to its higher flow speed within the pulser unit, or conversely.

EXAMPLE 1

Dual Concentric Pulsing Spilling Self-aerator

Figures 6, 6A:
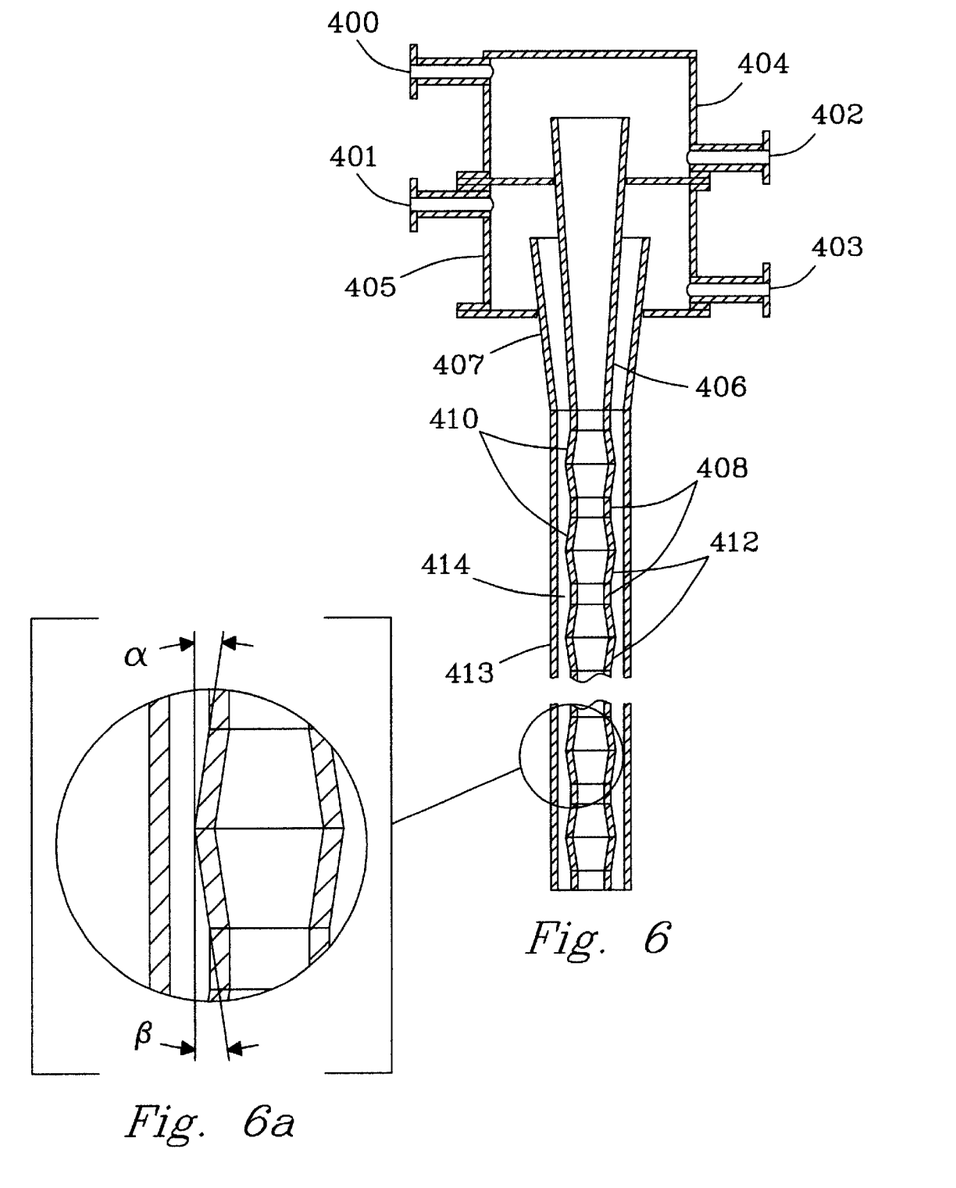
FIG. 6 is a graphic representation of a dual concentric pulsing spilling self-aerator.
FIG. 6a is an enlargement of a portion of FIG. 6 illustrating the angle of the diffuser cone and reducer cone with relationship to a straight duct.

A dual mPSSA design is shown in FIG. 6 comprising an upper first fluid inlet (first fluid inlet I) 402; an upper fluid chamber (fluid chamber I) 404; a lower first fluid inlet (first fluid inlet II) 403; a lower fluid chamber (fluid chamber II) 405; an inner conical fluid induction tube (fluid induction tube I) 406; an outer conical fluid induction tube (fluid induction tube II) 407; a pulser connection tube 408; a diffuser cone 410; a reducer cone 412; an outer straight duct 413; an upper second fluid inlet (second fluid inlet II) 400; and a lower second fluid inlet (second fluid inlet II) 401. In FIG. 6a, angle α is the half conical angle of the upper pulser tube and Angle β is the half conical angle of the lower pulser tube.

During operation, a first fluid, preferably a liquid is introduced into the fluid chambers 404 and 405 through first fluid inlets 402 and 403 respectively. The first fluid spills into both inner pulsing tube 414 and the outer cylindrical duct 413 through fluid induction tubes 406 and 407 as it reaches the brims or upper most edge of each, respectively. The free spilling fluid flow creates a vacuum in each fluid chamber and a second fluid, preferably air, is drawn into fluid chambers 404 and 405 through second fluid inlets 400 and 401. Coarse air bubbles are broken into fine air bubbles by shear forces as the gas-liquid mixture moves through the pulsing tube section. This action results in efficient oxygen transfer to the aqueous phase in both the inner and outer pulsing tubes. Therefore, for a common 100 m$^3$ reactor, only three to four dual PSSA units (FIG. 6) would be required for high oxygen transfer rate (13 to 18 kg-$O_2$m$^3$/hr) when a=1.0, b=2.0, $DS_{408}$=0.21 meter, and $DS_{413}$=0.63 meter ($DS_{408}$ being the diameter of the pulse connection tube and $DS_{413}$ being the diameter of the outer straight duct). For the case that a=1.0, b=1.5, $DS_{408}$=0.35 meter, and $DS_{413}$=0.88 meter, only two units of dual PSSA (FIG. 6) can provide sufficient oxygen transfer demand. Clearly, both are feasible options for the example reactor.

EXAMPLE 2

Circular Sheet-pulsing Spilling Self-aerator

Figure 7:
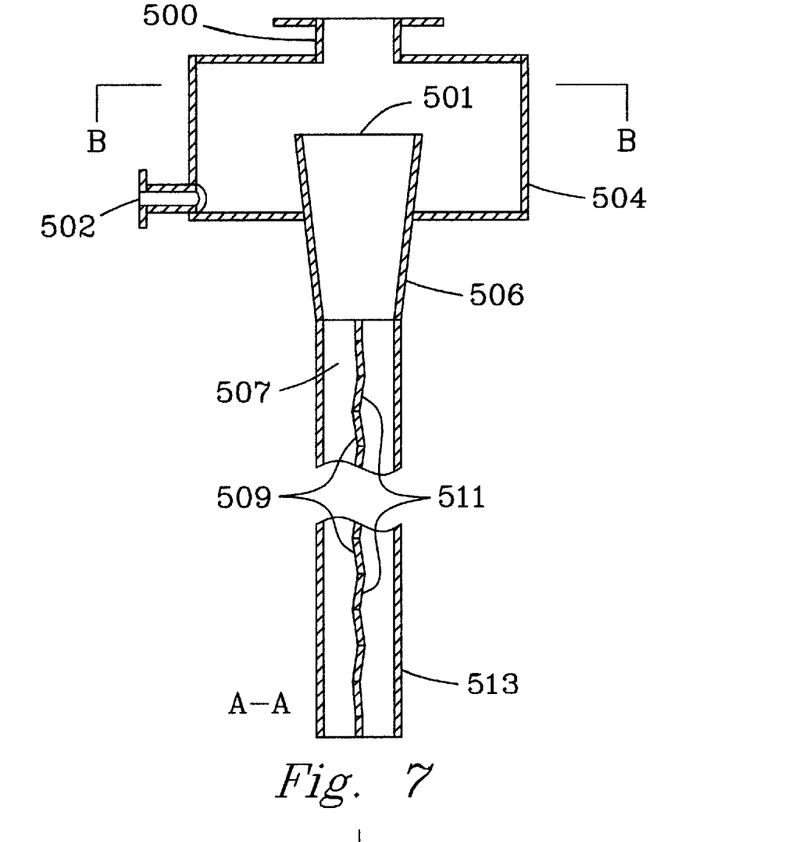
FIG. 7 is a graphic representation of a longitudinal sectional view of a cylindrical sheet-pulsing spilling self-aerator.
Figure 7A:
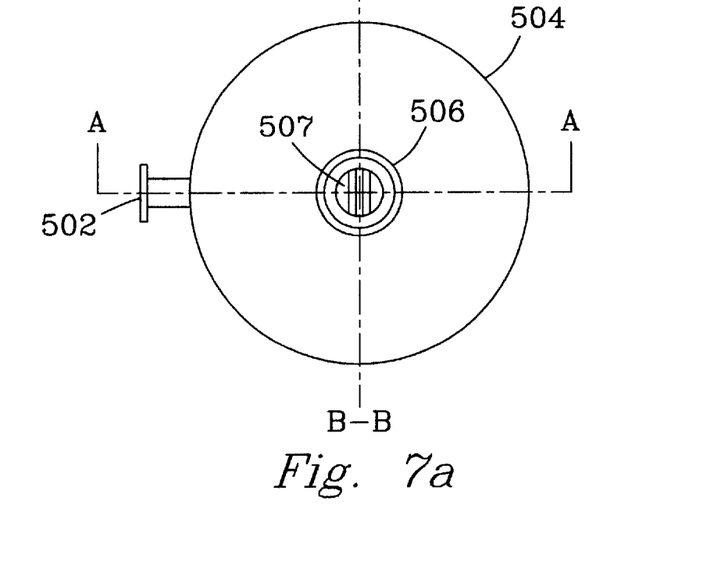
FIG. 7a is a graphic representation of a cross sectional view of a cylindrical sheet-pulsing spilling self-aerator taken along lines B—B of FIG. 8.
Figure 8:
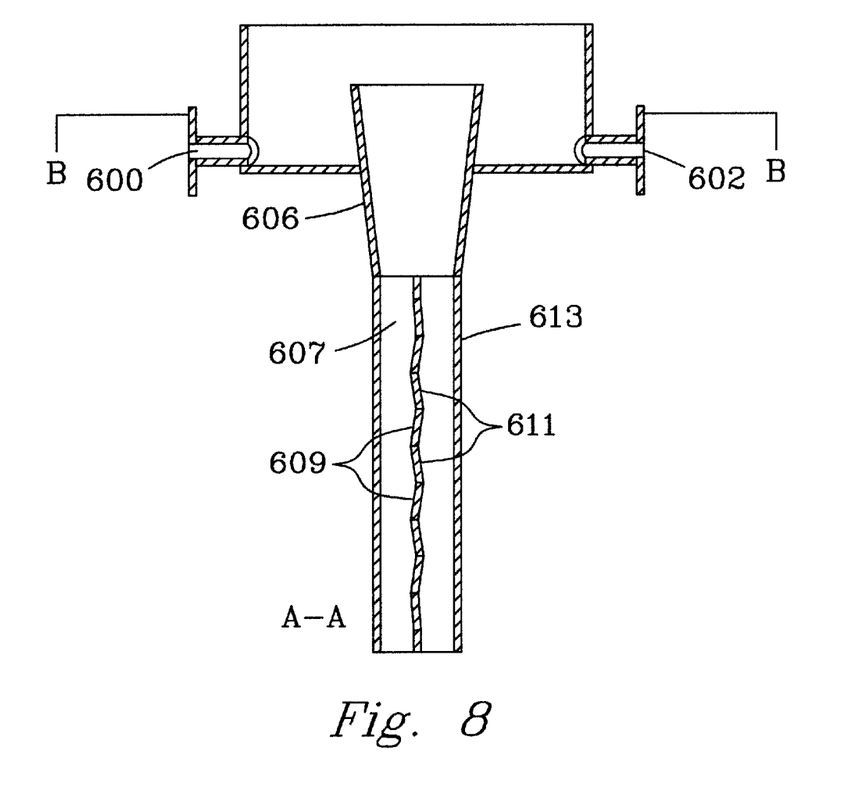
FIG. 8 is a graphic representation of a longitudinal sectional view of a rectangular sheet-pulsing spilling self-aerator.
Figure 8A:
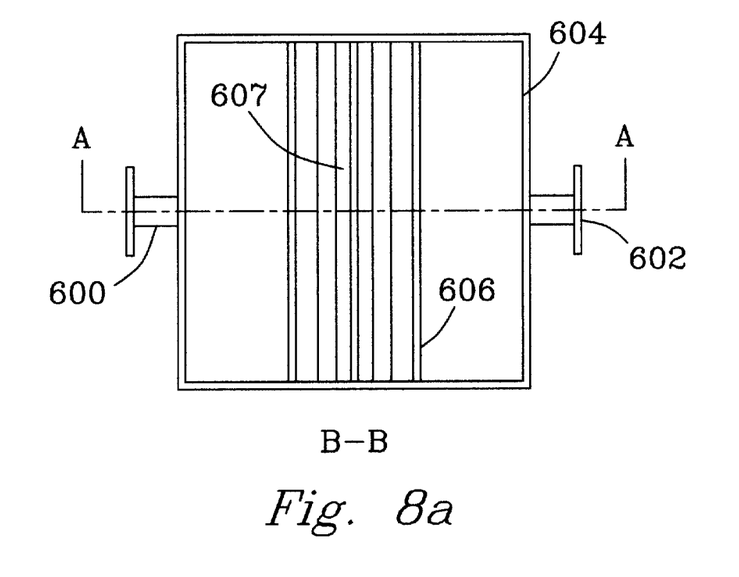
FIG. 8a is a graphic representation of a cross sectional view of rectangular sheet-pulsing spilling self-aerator taken along lines B—B of FIG. 9.

A circular sheet-pulsing spilling self-aerator is illustrated in FIG. 7. In this figure the first fluid inlet 502 is provided in the fluid chamber 504 at a point below the upper edge 501 of a circulating fluid induction tube 506; the second fluid inlet 500 is adjacent the top of fluid chamber 504; a pulsed-angular sheet 507 providing a series of pulsed-angular units interconnected, said angular units comprising a left-slanted pulsing sheet 509 and a right-slanted pulsing sheet 511, wherein an alternating periodic series of angular undulations or corrugations allow a pulsing flow of a fluid or fluid mixture, passing through the circular straight duct 513. "Left-slanted" and "right-slanted" are used here in merely to refer to different relative position or angle of alternating pulsed-angular sheets.

In this design, instead of using a circular pulsing tube as the pulser, a corrugated sheet, referred to, as a pulsed-angular sheet 507, is place in the middle of a circular straight duct 513 to create two-phase pulsing flow in the aerator. Fluid, preferably a liquid, is introduced into the fluid chamber 504 through a first fluid inlet 502, and freely overflows into the circular fluid induction tube 506, in which a vacuum is created. A second fluid, preferably air, is subsequently drawn into the mixing channel through the second fluid inlet 500 and coarse air bubbles are broken into fine air bubbles by pulsing flow created by the pulsing sheet 507, resulting in efficient oxygen transfer to the aqueous phase.

EXAMPLE 3

Rectangular Sheet Pulsing Spilling Self-aerator

A rectangular sheet pulsing spilling self-aerator is shown in FIG. 8, where 604 is the fluid chamber; 600 the first fluid inlet; 602 the second fluid inlet; 606 the fluid induction tube; 607 the pulsed-angular sheet; 609 the left-slanted pulsing sheet; 611 the right-slanted pulsing sheet; 613 the rectangular straight duct.

In this design, the pulser is a pulsed-angular sheet 607 that is placed within the rectangular straight duct 613. A fluid, preferably a liquid phase, such as wastewater, is introduced into to the fluid chamber 604, through first and second fluid inlets 600 and 602, and overflows into both pulsing rectangle aeration channels formed by the outside walls of the rectangular straight duct 613 and the pulsing sheet or pulser 607. The free spilling aqueous flow creates a vacuum in the aeration channel, drawing fluid into the rectangle sheet pulsing aerator through the fluid chamber 604, which is fully open to the outside environment (air). When the first and second fluids are a liquid and a gas such as air, coarse air bubbles are broken into fine air bubbles for efficient oxygen transfer to the aqueous phase in both pulsing channels using pulsing flow created by the pulsing sheet.

The rectangular sheet pulsing spilling self-aerator is designed in such a way that it can have either a square or rectangle shape, and it has a direct open fluid channel. Therefore, the sheet pulsing spilling self-aerator can be directly used for the aeration of aerobic basin in wastewater treatment.

EXAMPLE 4

Multiple Concentric Pulsing Spilling Self-aerator

Figures 9, 9A:
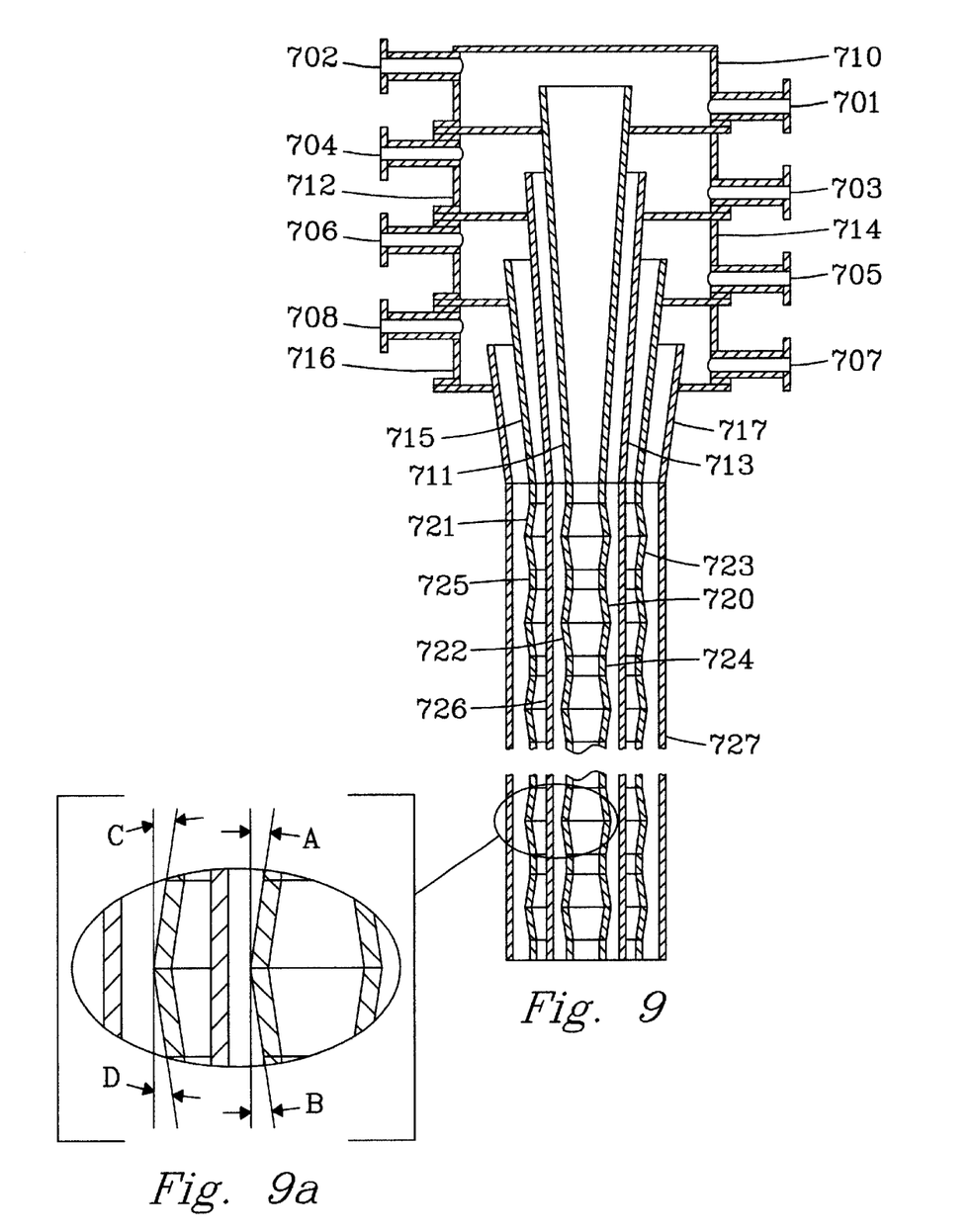
FIG. 9 is a graphic representation of a multiple concentric pulsing spilling self-aerator.
FIG. 9a is an enlargement of a portion of FIG. 9 illustrating the angles of the diffuser cones and reducer cones with relationship to the straight ducts.

A multiple concentric mPSSA is shown in FIG. 9, where Angle A is the half conical angle of the diffuser cone 720; Angle B the half conical angle of the reducer cone 722; Angle C: the half conical angle of the diffuser cone 721; Angle D the half conical angle of the reducer cone 723; the first fluid inlets 701, 703, 705, and 707; the fluid chambers 710, 712, 714, and 716; second fluid inlets 702, 704, 706, and 708; fluid induction tubes 711, 713, 715, and 717; pulser connection tubes 724 and 725, and straight ducts 726 and 727.

Operation of the multiple concentric mPSSA is similar to that described in the first three examples. A fluid, preferably liquid, such as water or fermentation broth, is introduced into to the fluid chambers 710, 712, 714, and 716 through first fluid inlets 701, 703, 705, and 707 respectively. Once the fluid level reaches the top of the fluid induction tube in each fluid chamber it spills into the corresponding pulsing tubes 711, 713, 715, and 719. The free spilling fluid flow creates a vacuum in each fluid chamber that subsequently pulls a second fluid, preferably air, into the fluid chambers 710, 712, 714, and 716 through second fluid inlets 702, 704, 706, and 708. If the second fluid is air or other gas, coarse air bubbles are disrupted into fine air bubbles for efficient oxygen transfer to the liquid phase as the gas-liquid mixture flows down the pulsing tubes. In this design, four layers of concentric mPSSAs are used. The external diameter of this mPSSA is calculated as the following formula when Dd/Dr=b:

$$D = 4 \times DM_{724} + 2 \times (b-1) \times DM7 + 8 \times LM$$

$DM_{724}$ is the internal diameter of the pulser connection tube and LM is the material thickness.

With this design, a 100-m³ reactor will have only one unit or two units of 3-layer mPSSAs, providing sufficient aeration rate (v.v.m.) and oxygen transfer rate (13 to 18 kg-$O_2$/m³/hr) since a three-layer mPSSA is equivalent to 13 single PSSA units when $\alpha=15°$, a=1.0, b=2.0, and $DM_{724}=0.21$ meter.

EXAMPLE 5

An Advanced PSSA Bioreactor System

Figure 10:
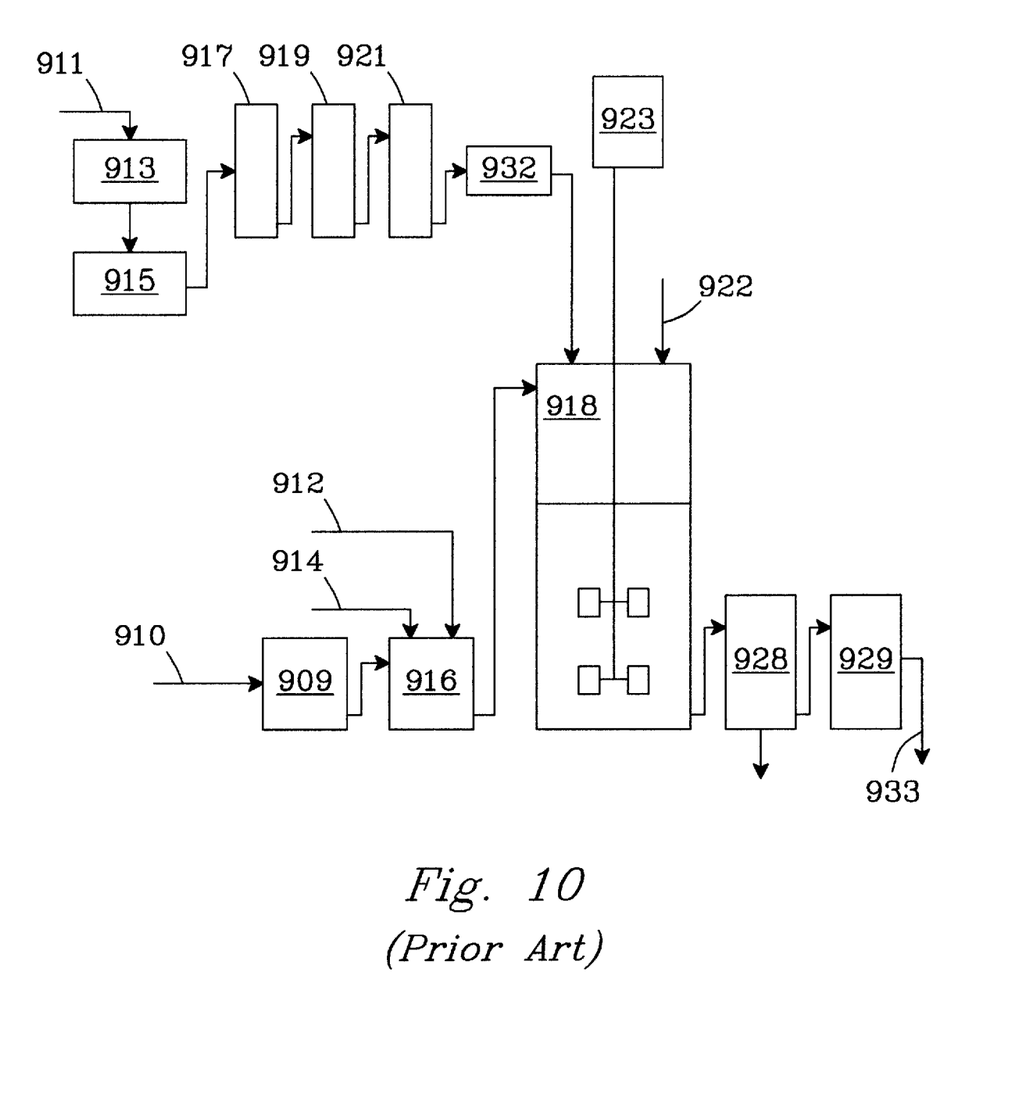
FIG. 10 is a process diagram of a conventional bioreactor system of the prior art.

FIG. 10 shows a conventional bioreactor system of the prior art. Air is provided by an air line 911 to an air compressor 913, which is then integrated with an air container 915. The air is provided from the air container 915 to the cooler 917, water separator 919, heater 921, and an air filter unit 932 prior to entering the bioreactor 918. Also provided to the bioreactor 918 is medium that results from the addition of starch 910, to a starch hydrolyzer unit 909, which is then provides the starch source to a medium mixer 916 of which nutrients 912 and water 914 are provided and mixed with the starch source. An inoculum of biomaterial (desired bio/cell source) 922 is then provided to the bioreactor 918 where it is allowed to grown under controlled conditions. The biomaterial is then provided from the bioreactor 918 to a separator 928 whereby the biomaterial is separated from the growth medium. The biomaterial is then sent to a cell breaker 929 for final processing which would involve enzyme separation and concentrating 933.

Figure 11:
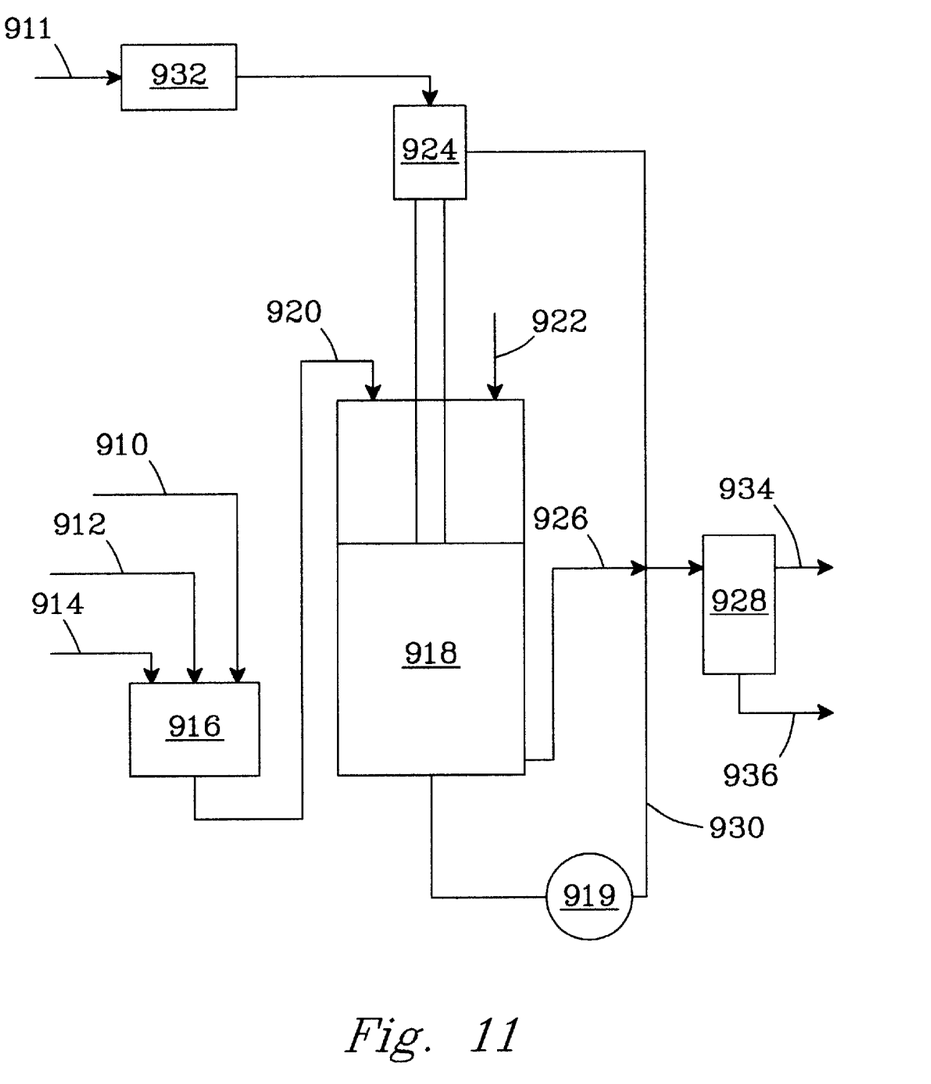
FIG. 11 is a process diagram of an advanced PSSA bioreactor system of the present invention.

As compared to FIG. 10, which shows a process diagram of a conventional bioreactor system of the prior art, FIG. 11 shows an advanced PSSA bioreactor system. The advanced PSSA bioreactor system allows for a carbon source 910, nutrient media 912, and water 914 to be introduced into a mixer 916. The carbon source 910 can be any readily available inexpensive product such as a starch source, but Applicants have found that the processing by-products of, for example, food processing, are available and inexpensive. The nutrient mix 912 is comprised of an appropriate mixture of those nutrients necessary to optimize the process for a particular microorganism, carbon source, and expected end product. For example, it is often required that nitrogen, phosphorus, and trace minerals are added.

Also added into the bioreactor 918 along with the fluid mixture 920 from the mixer 916 is the microorganism inoculum 922. The microorganism can be any microorganism capable of producing a bioproduct. Applicants have found that yeasts and fungi are particularly useful in this application.

In order to ensure maximum bioprocessing, the culture medium in the bioprocessor 918 is aerated and agitated. In the preferred embodiment, a pulse spilling self-aeration (PSSA) aerator 924 is used. Alternatively, variations of the PSSA can be utilized. After sufficient culturing to achieve maximum production of the desired bio-product, the culture medium is withdrawn from the bioprocessor 918, as through line 926, and the biomass is separated from the desired product in a separator 928. The aqueous fluid may be recycled, as through line 930 via positive pressure provided by a pump 919, to the PSSA aerator 924. The air entrained in the PSSA stream may be filtered through an air filter 932 prior to entering the aerator 924. The biomass may thereafter be directed, at 934, to a drying process, while the bio-product is directed, at 936, to further separation and purification processes.

A 50,000-liter bioreactor was equipped with three single PSSA units and used for the aerobic fermentation process for the production of pharmaceutical yeast. These PSSA units were scaled up based on the geometric structure as shown in FIG. 2. The operation performance is listed as in the following table. The aeration ration is defined as volume of air per volume of liquid per minute (v.v.m.), and the aeration efficiency is defined as volume of air per volume of liquid circulated through PSSA.

Pharmaceutical yeast was continuously cultured in the 50,000-liter PSSA reactor in a medium using molasses as the primary carbon source supplemented with urea, ammonium sulfate, and phosphoric acid as nitrogen and phosphorus sources, respectively. Table 2 lists results of several continuous cultures of yeast biomass production. The results show that the production rate can reach as high as 99.6 Kg dried biomass (DBM) per hour and the average power consumption for the biomass is as low as 0.24 Kw-hr/Kg-DBM.

TABLE 1

Aeration rate under different working volume

| Working volume (liter) | Aeration rate (liter/hr) | Aeration ratio (v.v.m.) | Aeration efficiency (v.v.) |
|---|---|---|---|
| 30,000 | 2,280,000 | 1:1.27 | 4.22 |
| 40,000 | 2,112,000 | 1:0.88 | 3.91 |

TABLE 2

Results of continuous cultures of pharmaceutical yeast biomass.

| Culture No. | Culture time (hour) | Production rate (Kg-DBM/hr) | Average Power Consumption (Kw-hr/Kg-DBM) |
|---|---|---|---|
| 1 | 42 | 36.8 | 0.65 |
| 3 | 122 | 86.9 | 0.28 |
| 5 | 74 | 67.3 | 0.36 |
| 11 | 70 | 99.5 | 0.24 |

CLOSURE

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of mixing at least two fluid streams, comprising the steps of:
   a. circulating a first fluid through a pulse spilled self-aerator (PSSA) such that a vacuum is generated at a discrete point within the PSSA,
   b. providing a fluid mixture by entraining a second fluid into the first fluid at the location of the discrete point via said vacuum,
   c. mixing and agitating the fluid streams by a pulsing flow aided by gravitation flow vertically down a plurality of concentric units, said units comprising at least one straight duct and at least one fluid pulser.

2. The method of claim 1, wherein said fluid stream may be utilized in chemical, biochemical and wastewater treatment processes.

3. The method of claim 1, wherein the straight duct is cylindrical.

4. The method of claim 1, wherein the straight duct is rectangular.

5. The method of claim 1, wherein the straight duct comprises a plurality of concentrically oriented ducts.

6. The method of claim 1, wherein the fluid pulser is a pulsed-angular sheet providing an alternating periodic series of angular undulations.

7. The method of claim 1, wherein the fluid pulser is a cylindrical pulser tube comprising a diffusing cone and reducing cone affixed to one another, with adjacent pulsing units connected together by a pulser connection tube there between.

8. The method of claim 7, wherein the cylindrical pulser tube comprises a plurality of concentrically oriented pulsing units.

9. The method of claim 1, wherein the first fluid may be selected from the group consisting of wastewater, nutrient media, and liquid cultures comprising living organisms.

10. The method of claim 9, wherein the liquid cultures contain genetically engineered microorganisms.

11. The method of claim 1, wherein the second fluid may be a fluid-like stream selected from the group consisting of liquid, gas, and solid particles.

12. The method of claim 11, wherein the gas may be selected from the group consisting of carbon dioxide ($CO_2$), nitrogen ($N_2$) and oxygen ($O_2$).

13. The method of claim 11, wherein the liquid may be selected from the group consisting of nutrient media, and liquid cultures.

14. The method of claim 13, wherein the liquid cultures contain genetically engineered microorganisms.

15. An apparatus for mixing at least two fluid streams, comprising:
   a. a fluid chamber wherein a first fluid is introduced through a first fluid inlet therein spilling and overflowing;
   b. a fluid induction cone within said fluid chamber to accommodate spilling and overflowing of said first fluid by providing a brim,
   c. a second fluid is introduced through a second fluid inlet by a vacuum generated at a discrete point by said spilling and overflowing of said first fluid;
   d. a straight duct that confines and directs gravitational flow of said first fluid and said second fluid introduced through said fluid induction cone to allow a fluid mixture flow of said first and second fluids, e. and a fluid pulser contained within said straight duct, allowing diffusion and reduction of said fluid mixture flow.

16. The apparatus in claim 15, wherein said apparatus consists of a plurality of fluid chambers and fluid inducers.

17. The apparatus in claim 15, wherein the straight duct is cylindrical.

18. The apparatus in claim 15, wherein the straight duct is rectangular.

19. The apparatus in claim 15, wherein a plurality of straight ducts is provided concentric to one another.

20. The apparatus in claim 15, wherein the fluid pulser unit is a cylindrical fluid pulser with a plurality of pulsing units comprising a diffusing cone and reducing cone affixed to one another with a connection tube for a next pulsing unit connection.

21. The apparatus in claim 20, wherein a plurality of cylindrical fluid pulsing units is provided concentric to one another.

22. The apparatus in claim 15, wherein the fluid pulsing unit is a pulsed-angular sheet.

* * * * *